(12) United States Patent
Aseere et al.

(10) Patent No.: US 7,803,727 B2
(45) Date of Patent: Sep. 28, 2010

(54) VINYL FLOOR COVERING SYSTEM WITH WOVEN OR NON-WOVEN GLASS FIBER MAT SEGMENTED REINFORCEMENT

(75) Inventors: Lester Mickel Aseere, Parker, CO (US); Amy Jean Leverson, Denver, CO (US); Kristin Franz Goya Obernyer, Denver, CO (US)

(73) Assignee: Johns Manville, Denver, CO (US)

( * ) Notice: Subject to any disclaimer, the term of this patent is extended or adjusted under 35 U.S.C. 154(b) by 1260 days.

(21) Appl. No.: 10/919,098

(22) Filed: Aug. 16, 2004

(65) Prior Publication Data

US 2006/0035550 A1    Feb. 16, 2006

(51) Int. Cl.
*B32B 17/06* (2006.01)
(52) U.S. Cl. .................. 442/180; 442/59; 442/149; 428/47
(58) Field of Classification Search .............. 428/47; 442/59, 149, 180
See application file for complete search history.

(56) References Cited

U.S. PATENT DOCUMENTS 5,080,944 A * 1/1992 Kauffman et al. ............ 428/47

* cited by examiner

*Primary Examiner*—Andrew T Piziali
*Assistant Examiner*—Peter Y Choi
(74) *Attorney, Agent, or Firm*—Robert D. Touslee

(57) ABSTRACT

A vinyl floor covering is provided with reinforcement of segmented woven or non-woven glass fiber mat located on the underside of the vinyl floor covering or at or near the neutral axis of the vinyl floor covering. This segmented mat reinforcement increases the stiffness and mechanical properties of the vinyl floor covering. A polymeric binder separates the segments of the glass fiber mat from each other. Expansion or contraction of the installed vinyl floor covering is restricted to this polymeric binder region. The segments may be aligned with the vinyl floor covering's show surface patterns, thereby preserving pattern integrity. The segmented mat is manufactured by applying and curing a polymeric binder to a woven or non-woven glass fiber mat, and creating segments by the passing the woven or non-woven glass fiber mat with polymeric binder through a set of embossing rollers. The segmented woven or non-woven glass fiber mat with polymeric binder is easily handled by vinyl floor covering machinery.

10 Claims, 3 Drawing Sheets

VINYL FLOOR COVERING SYSTEM WITH WOVEN OR NON-WOVEN GLASS FIBER MAT SEGMENTED REINFORCEMENT

BACKGROUND OF THE INVENTION

1. Field of the Invention

The present invention relates to a woven or non-woven glass mat; and more particularly, to a woven or non-woven glass mat suited for use as an attached or embedded backing of a vinyl floor covering to accommodate floor dimensional changes due to temperature variations and floor bending stresses resulting in expansion or contraction of floor surface.

2. Description of the Prior Art

Vinyl floor coverings are commonly used in the construction industry in a wide variety of applications including domestic and industrial floorings. Vinyl floor coverings provide easy installation, availability of varied geometric textures, colors, and patterns. When the vinyl floor covering is unreinforced, it has a tendency to sag, and change shape in rolls that are sold, depending on how they are rolled and stored. Furthermore, the vinyl floor covering may acquire permanent creases, and may not lie flat on the floor during installation. Non-glass reinforced material may also expand, contract, curl, blister, or tear with changes in temperature and relative humidity.

The vinyl sheet floor covering utilizes a backing or reinforcing material that is part of the construction. The backing surface directly contacts the floor surface upon installation of the floor covering. Glass fiber mats are considered very desirable backings for floor coverings, despite certain limitations inherent to such backings. Specifically, when the sub floor is composed of wood or other materials, the floor tends to expand and contract beyond the ability of the glass mat backing. For this reason, manufacturers use a felt or paper back in North America where most floors are wooden and the flooring is glued in place. In Europe most floors are composed of concrete, and experience very little expansion and contraction. As a result, most European vinyl floor coverings have a glass mat backing that takes advantage of the dimensional stability of glass and does not require gluing.

The relative dimensional stability of such glass fiber reinforced vinyl floor coverings is desirable when installed over concrete, but may cause problems when installed over a wood sub-floor. Wood sub-floors exhibit relatively large dimensional changes in response to temperature and humidity changes. In wintertime, wood sub-floors tend to dry out, shrinking the wood by as much as 0.5%. Unless the floor covering is able to compress (i.e., shrink) along with this dimensional change in the sub-floor, the floor covering may respond by buckling.

Vinyl floor coverings have been reinforced with glass fiber backing in order to provide some structural rigidity. The glass fibers, in the form of woven or non-woven glass fibers, is bonded to the underside of the vinyl floor covering; on the surface opposed to the texture, color, and pattern of the show surface. When the vinyl floor covering is installed on a wooden, or other sub-flooring, the vinyl floor covering may separate from the sub-flooring when the floor is under stress or expands/contracts due to thermal excursions. The vinyl floor covering having a glass fiber mat on its underside does not elongate or compress to maintain the shape of the sub-flooring. As a result the bond between the vinyl floor covering provided with the glass fiber underside reinforcement and the sub-flooring is broken at highly stressed locations. This results in eventual separation of the vinyl floor covering from the sub-flooring, creating unsightly 'bubbles' or lifted edges, and ultimately requiring a complete replacement of the vinyl floor covering. In cases where the bond to floor remains, the glass mat may tear, creating pattern distortions and ripples.

A number of patents discuss various fiber reinforcement strategies for vinyl floor coverings.

U.S. Pat. No. 2,800,423 to De Swart (hereinafter the '423 patent) discloses a molded article of stretchable glass fiber cloth, which is readily stretchable in all directions in the plane of the fabric. The glass fiber cloth itself is generally not stretchable and is a complex polymeric cloth with glass fiber reinforcement that requires cutting the glass cloth into small shaped pieces. According to the '423 patent disclosure, the non-elastic fiber fabric is provided with a number of slits that allows the stretching of the glass fabric. Specifically, the '423 patent discloses a molded article of stretchable glass fiber cloth. The stretching of the glass fiber occurs prior to the molding operation wherein the glass fiber is free to stretch. Once the glass fiber cloth is molded within the polymeric matrix, the glass fiber is not stretchable. There is no hint or suggestion that the polymeric matrix having the slitted glass fiber cloth has the ability to accommodate expansion and contraction tensions. This is not a vinyl floor covering, but is rather a molded polymer which has glass fiber cloth with slits provided as a reinforcement.

U.S. Pat. No. 5,080,944 and its divisional U.S. Pat. No. 5,188,874 to Kauffman et al. (hereinafter the '944 patent) discloses a hybrid floor covering. The object of the invention is to provide a vinyl floor covering that accommodates wood sub-floor contraction and expansion as well as rolling load. The floor covering incorporates a foamed plastisol encapsulated glass mat, which may be cut to form pivot points and expanded under a controlled pre-stressed condition. The glass mat serves as a carrier during manufacture, and acts as an "elastic glass" reinforcing layer during use for either tension or loose-lay flooring. The floor covering may be a true hybrid surface covering capable of accommodating the dimensional change of a target sub-floor by utilizing the characteristics of both tension floorings and loose-lay floorings. The resilient floor covering disclosed in the '944 patent has a matrix surrounding a reinforcing layer. The matrix with the surrounding reinforcing layer is modified by chemical or mechanical means to have relaxed compressive and tensile stiffness so that it will elongate under tension and resist bending under compression. The floor covering may be used as a loose lay surface covering or as a tension surface covering over wooden sub-floors comprising a reinforcing layer having regions of differential relaxed compressive/tensile stiffness. The reinforcing layer is formed by a pattern of line segments comprising a plurality of substantially parallel and linearly spaced first line segments and second line segments which are non-intersecting. The segments form pivot points cooperating such that the surface covering product is elongated in a direction generally transverse to an applied tensile stretching force. The surface covering having a reinforcing layer that is an expandable diagonal patterned glass mat as illustrated in FIG. 1 and FIG. 2 of the '944 patent in which the glass mat is encapsulated with a plastisol. Because of the controlled pre-stressed condition of the reinforcing layer, the adjacent sides of the slits are pulled apart. The slits interact to form pivot points, which cooperate such that the reinforcing layer is capable of increasing in dimension and decreasing in dimension, respectively, in a direction generally transverse to an applied tensile or compression force. The fiber mat is cut along mutually non-intersecting line patterns so as to form pivot points that enlarge the cut lines, creating expansion of the mat. Since glass fibers do not elongate in length, expansion can be only be accommodated by slippage of the glass fibers within the plastisol encapsulation. There is no possibility of increasing the length of the floor covering unless the fibers slip within the plastisol encapsulant. Again, the plastisol encapsulated glass fiber mat provides very little improvement to the vinyl floor covering since load is minimally shared by glass fiber reinforcement due to plastisol encapsulation.

U.S. Pat. No. 5,082,708 to Kauffman et al. (hereinafter the '708 patent) discloses a tension floor covering with a reinforcing layer. The vinyl tension floor covering includes a reinforcing layer, preferably disposed below the neutral bending plane. The floor covering elongates in at least one direction due to a controlled pre-stressed condition and tends to return to its original pre-elongated dimensions. Reinforcing layers expand in the across machine direction as well as machine direction in response to tensile stretching forces in the machine direction or roll-up growth. As in U.S. Pat. No. 5,080,944 (discussed and referenced herein above as the '944 patent) the resilient, tension floor covering disclosed by the '708 patent has a continuous matrix surrounding and covering a reinforcing layer. The reinforcing layer has been modified by chemical or mechanical means to have a relaxed compressive stiffness and relaxed tensile stiffness. Due to the relaxation, the floor covering has the ability to elongate under tension, wherein the reinforcing layer is elongated in at least one direction. The total of the elongation and shrinkage, due to aging of the floor covering, is greater than 0.2% as measured over a six week period at room temperature. The fiber mat is cut along mutually non-intersecting line patterns so as to form pivot points that enlarge the cut lines, creating expansion of the mat. Since glass fibers do not elongate in length, it can be only accommodated by slippage of the glass fiber within the plastisol encapsulation. There is no possibility for increasing the overall length of the vinyl floor covering unless the reinforcing fiber slips within plastisol encapsulation. The reinforcing layer is located below the neutral axis of the vinyl floor covering. Again, the plastisol encapsulated glass fiber mat provides very little improvement to the vinyl floor covering since load is minimally shared by glass fiber reinforcement due to plastisol encapsulation.

U.S. Pat. No. 5,935,879 and its divisional U.S. Pat. No. 5,972,166 to Helwig et al. (hereinafter the '879 patent) discloses a non-woven fiber mat and method for forming same. The non-woven fiber mat is suitable for reinforcing resilient sheet floor coverings, such as vinyl floor coverings. The non-woven fiber mat is in the form of a sheet of reinforcement fibers which, at least, includes semi-coiled fibers and can also include coiled fiber, with one or more turns, and even some relatively straight or slightly curved fibers. It is desirable for most, if not all, of the reinforcement fibers to be made from glass. However, it may also be desirable for the reinforcement fibers to include glass fibers and synthetic fibers. It may even be possible for the reinforcement fibers to include only non-glass fibers. At least one polymeric binder is used for bonding together the reinforcement fibers so as to make the fiber mat a suitable substrate for reinforcing resilient sheet floor coverings, such as an interlayer for vinyl floor coverings. By using a non-woven fiber mat containing reinforcement fibers that are not completely straight and capable of interlocking with one another, a resilient sheet floor covering made with such a mat can exhibit improved planar compressibility. The '879 patent discloses that the non-woven fiber mat is wet laid. One or more binders may be used to bind the reinforcement fibers together in the form of a sheet so as to at least enable the base mat to be subsequently processed in-line or wound into a roll for subsequent off-line processing into the present non-woven fiber mat. The binders which may be used with the base mat include thermoplastic-type polymeric binders. These binders can be in particle form (e.g., poly(vinyl alcohol) powder), fiber form (e.g., made from a vinyl chloride copolymer or a copolyester), or a combination of both. These binders are at least partially fused to bond to the reinforcement fibers. The curved sections of the fibers interlock with one another and resist planar elongation and yet allow a greater degree of planar compressive movement than that exhibited by straight fiber mats. The '879 patent discloses a non-woven fiber mat and method for forming the same. Relatively long chopped fibers of glass and other synthetic fibers are mixed and wet laid to form curved segments of glass. These glass segments are bonded together with a primary polymeric binder for ease of handling the non-woven mat through vinyl floor covering manufacturing machinery. A secondary binder is used to rigidly bond the fibers and thereby provide substantial resistance to planar elongation, while allowing for a substantial degree of planar compressive movement. When the flooring expands, the backing of the non-woven fibers correspondingly expands to prevent delamination of the reinforcement layer. It only accommodates compression of the vinyl floor covering. This is due to the rigid bonding of the curved segments of glass fibers by the secondary binder.

U.S. Pat. No. 6,017,835 to Potter (hereinafter the '835 patent) discloses glass compositions for producing dual-glass fibers. Compositions for producing irregularly-shaped dual-glass fibers include a first glass composition and a second glass composition. The first and second glass compositions have nonidentical coefficients of thermal expansion, the difference between the coefficients of thermal expansion being greater than about 2.0 ppm/° C. and preferably 5.0 ppm/° C. These irregularly-shaped glass fibers are suitable for insulation and are produced by extrusion from orifices of a spinner in a rotary process. The first glass composition, A, is preferably a high-borate, low-soda lime-aluminosilicate glass composition having a borate content within the range of from about 14% to about 24% by weight. The second glass composition, B, is preferably a high-soda, low-borate lime-aluminosilicate glass composition having a soda content within the range of from about 14% to about 25% by weight. The liquidus of each of the first and second glass compositions is at least 50° F. (28° C.) below that at which the glass viscosity is 1000 poise. Preferably the liquidus temperature is more than about 200° F. (111° C.) below that at which the glass viscosity is 1000 poise. The difference in coefficient of thermal expansion between glass A and glass B in part gives rise to the irregular shape of the fibers; this difference also controls the degree of bend in individual dual-glass fibers. The difference in the coefficient of thermal expansion must be sufficiently large to cause the right degree of bend in each dual-glass fiber to insure that the fibers are attenuated into irregularly-shaped glass fibers yielding the right amount of entanglement. If the difference is too small, the dual-glass fibers have too large a radius of curvature. The '835 patent discloses glass compositions for producing dual glass fibers. The dual glass spinneret is disclosed for producing a dual glass fiber that has two glasses with differing coefficients of thermal expansion encasing each other and thereby naturally producing a bent fiber that produces the correct degree of entanglement for a non-woven mat used in insulation. There is no indication that this non-woven entangled mat is used in a vinyl floor covering.

Notwithstanding the advances in the field of vinyl floor coverings and related articles with glass fiber reinforcements, there remains a need in the art for a vinyl floor covering that has improved bonding characteristics with sub-flooring. Also needed is a vinyl floor covering that accommodates thermal expansions/contractions and withstands usage stresses without bond delamination. Further needed is a vinyl floor covering that is readily produced in a cost efficient manner. Still further, there is needed a vinyl floor covering that is non-glued and has the ability to float where desired, and remains flat, owing to its enhanced dimensional stability.

SUMMARY OF THE INVENTION

The present invention provides a woven or non-woven glass mat especially suited for use as an attached backing or molded reinforcement to a vinyl sheet floor covering for expanding or contracting surfaces. An embossing/scoring process is used in the manufacturing of the woven or non-woven glass fiber mat, which is coated with a polymeric binder. The polymeric binder is selected to be compatible with vinyl compositions used for the vinyl floor covering. Compositions of this nature are selected from a group comprising polyethylene, polyvinyl chloride, and other vinyl polymers. The resulting embossed/scored woven or non-woven glass fiber mat exhibits discontinuities in the form of small segments separated by polymeric binder and can be handled easily by processing machinery. Moreover, the glass fiber mat also provides dimensional stability when used as a backing or molded reinforcement in a vinyl floor covering. The small segments provide rigidity capability to the vinyl floor covering while the floor expansion/contraction is accommodated by the stretching or contraction of polymeric binder between the segments of glass fiber mat. Due to the resulting dimensional stability, this woven or non-woven glass fiber mat has application as a backing or molded reinforcement for a vinyl floor covering used on an expanding/contracting floor, such as wood, that is floating or glued in place.

The expansion/contraction problem is created by the inherent characteristic of glass mats. Characteristically, these mats have very little tolerance, if any, to expansion/contraction tensions caused by changes in temperature and/or humidity in a building. As the room or floor expands or contracts the glass fiber mat will not follow suit. As a result the floor covering's backing may come apart, delaminate, shed, or produce other undesirable results. These troublesome problems are overcome by the glass mat of the subject system, which is intentionally embossed, scored, crushed, dissolved, or otherwise treated to disrupt mat tensile properties creating smaller segments bonded by a polymeric coating. After construction of the floor covering, the glass mat is provided with random or patterned disruptions of interlocked glass fibers. As a result the glass fibers, in the form of small segments, break from each other. Once installed, any subsequent expansion/contraction is focused in these treated areas of the glass mat rather than over the entire floor covering's surface. The resulting vinyl floor covering system affords a controlled response to expansion/contraction of the sub-floor, while still taking advantage of the excellent dimensional stability of the glass mat backing.

The size and pattern of embossed or scored parting lines can be customized to align with patterns on the show surface of the floor covering, such as simulated grout lines. The segments of woven or non-woven glass fiber may have dimensions ranging from 2 mm to 50 mm, preferably 5 mm to 40 mm, and more preferably 10 mm to 30 mm. Patterns could also be random or other shapes to distribute movement over a non-uniform area. Any stretching of the vinyl would be focused at such customized embossed or scored parting lines, without disrupting any other patterns or designs on the surface.

Significantly, it has been found that the addition of the embossed or scored parting lines (or other randomly distributed shapes) on woven or non-woven glass fiber mats on the back of a vinyl sheet allows manufacturers the flexibility to take advantage of the many positive properties of a glass backed covering. Moreover, the embossed or scored parting lines are useful for controlling the previous limitations when applied to an expanding/contracting sub-floor. The embossing/scoring process described herein provides a vinyl floor covering system that exhibits exceptional dimensional stability. Advantageously, the vinyl floor covering system provides dimensional stability even when used on wood or other flooring that is subject to significant expansion/contraction.

The use of the embossed or scored parting lines (or other randomly distributed shapes) on woven or non-woven glass fiber mats incorporated by molding within the vinyl floor covering particularly at or near the neutral axis of the vinyl floor covering sheet has significant advantages. In this alternate embodiment, the segmented glass fiber woven or non-woven glass fiber mat is integrally incorporated within the vinyl flooring. The embossed or scored woven or non-woven glass fiber mat is positioned at or near the neutral axis so that it is insignificantly stressed when the vinyl floor covering is rolled. However, the segments of the woven or non-woven glass fiber mat provides stiffness to the vinyl floor covering, yet accommodates the thermally based or stress based expansions and contractions of the vinyl floor covering. This accommodation is accomplished by displacements occurring within the polymeric binder between the glass fiber mat segments.

The process of manufacturing segmented woven or non-woven glass fiber mats involves selecting a woven or non-woven glass fiber mat of appropriate dimensions, coating it with a polymeric binder composition, and curing the polymeric binder so that it has mechanical strength. The woven or non-woven glass fiber mat with polymeric binder is fed through a set of embossing or scoring rollers having matting patterns representing the scoring or parting lines. The woven or non-woven glass fiber mat with polymeric binder is subjected to sharp radius bends thereby segmenting the woven or non-woven glass fiber mat into discrete segments held together by the polymeric binder. In the absence of the polymeric binder these segments tend to separate from each other, with the result that the integrity of the woven or non-woven segmented glass fiber mat is not preserved. Mat segmentation can alternatively be carried out after the mat is in the vinyl floor construct, or during the process of placing it therewithin. This segmented mat is fed through machinery to bond to the underside of a vinyl floor covering, or is integrated with vinyl floor covering molding machine to place the segmented glass fiber mat at or near the neutral axis of the vinyl floor covering. Since the polymeric binder used is fully compatible with the vinyl composition used for the manufacture of the vinyl floor covering, the bond is seamless.

BRIEF DESCRIPTION OF THE DRAWING

The invention will be more fully understood and further advantages will become apparent when reference is had to the following detailed description of the preferred embodiments of the invention and the accompanying drawings, in which.

DETAILED DESCRIPTION OF THE INVENTION

The present invention provides a woven or non-woven glass fiber mat that has been bonded with a polymeric coating and segmented using patterned embossing rollers to substantially create smaller segments of a woven or a non-woven glass fiber mat. This segmented woven or non-woven glass fiber mat is incorporated within a vinyl sheet floor covering, adhered either on the underside or near the neutral axis of the vinyl sheet floor covering. When the sub-floor, to which the vinyl floor covering with woven or non-woven glass fiber matting is bonded, expands and contracts the physical deformation is readily accommodated by the vinyl sheet floor covering. This physical accommodation is achieved due to utilization of a polymeric coating located between the segments of the woven or non-woven glass fiber mat in order to form a segmented glass fiber mat structure. The segmented glass fiber mat provides structural rigidity and stiffness to the vinyl sheet floor covering without compromising its' ability to accommodate deformations of the sub flooring. In the absence of this segmentation feature, the glass fiber mat backing would delaminate and cause the vinyl sheet floor covering to separate from the sub-flooring.

The glass fiber mat is prepared by initially forming a woven or non-woven glass fiber mat. The formed glass fiber mat is then coated with a polymer having sufficient plasticity characteristics. The polymeric coating has plastic properties that enable the glass fiber mat to retain its' structure when the mat is bent at sharp radius, thereby breaking the glass fibers. The glass fiber mat is then wound on a process roller and fed between two embossing rollers. The embossing rollers subject the woven or non-woven glass fiber mat with polymeric coating to sharp radius, fracturing the glass fibers along the lines of the pattern. The polymeric coating continues to hold the segments of the glass fiber mat together allowing further processing of the resultant segmented glass fiber mat. This segmented glass fiber mat is then inserted into a vinyl sheet floor covering. The segmented glass fiber mat may be adhered on the backside or on or near the neutral axis of the vinyl sheet floor covering. It may delineate patterns printed on the vinyl floor covering so that the pattern regions are encompassed by the segmented regions of the glass fiber mat. The movement of the vinyl floor covering occurs between the segments, while the printed pattern is not disturbed.

Figure 1:
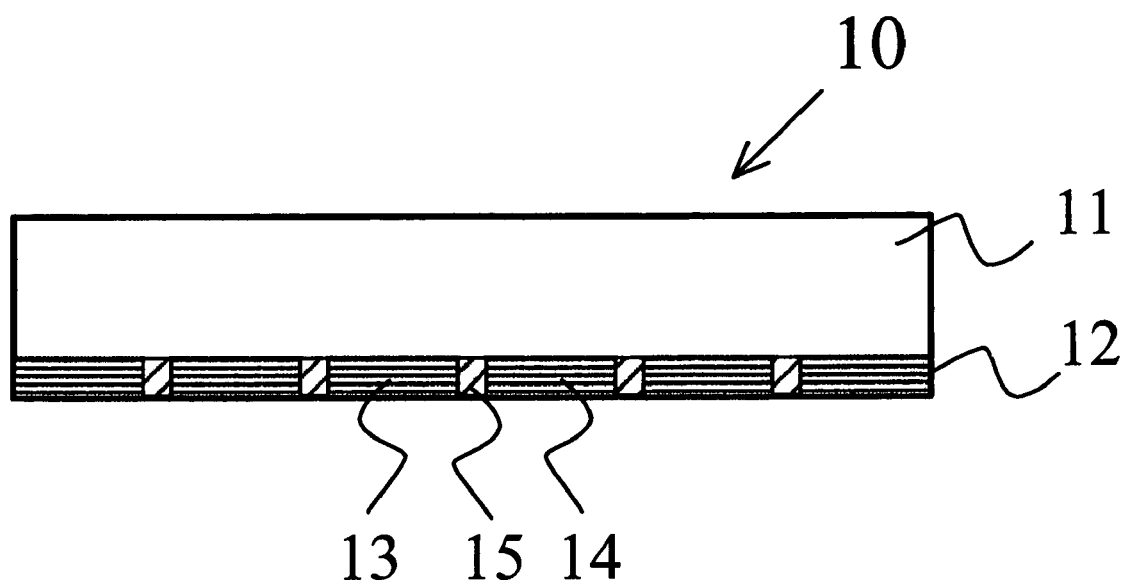
FIG. 1 is a schematic diagram of a segmented glass fiber mat incorporated on the underside of a vinyl sheet floor covering.

A schematic representation of the segmented glass fiber mat is shown in FIG. 1, which depicts the segmented glass fiber mat incorporated on the underside of a vinyl sheet floor covering. There is shown at 10 a vinyl sheet floor covering 11 with a segmented glass fiber mat at 12 adhered at or near the backside of the vinyl sheet floor covering 11. The segmented glass fiber mat 12 is in close proximity to the top surface of the sub floor, closely matching its deformation character. The segmented glass fiber mat 12 may be a woven or non-woven glass fiber mat that has been passed through a pair of patterned embossing rollers creating fiber fracture and segmentation. The segment pair 13 and 14 is held together by a polymeric coating 15. These segments 13 and 14 are at specific locations to accommodate the tensile stretch or compression of the vinyl sheet floor covering. A non-woven fiber segment may have some curved fibers that might mildly accommodate the stretch of a segment, but a woven glass fiber mat segment has no ability to stretch. The segmented glass fiber mat 12 is not the part that accommodates the deformation induced by the sub floor, but it is the polymeric coating 15 located between the segments 13 and 14 of the glass fiber mat that deforms with ease to accommodate the sub floor's physical deformation.

Figure 2:
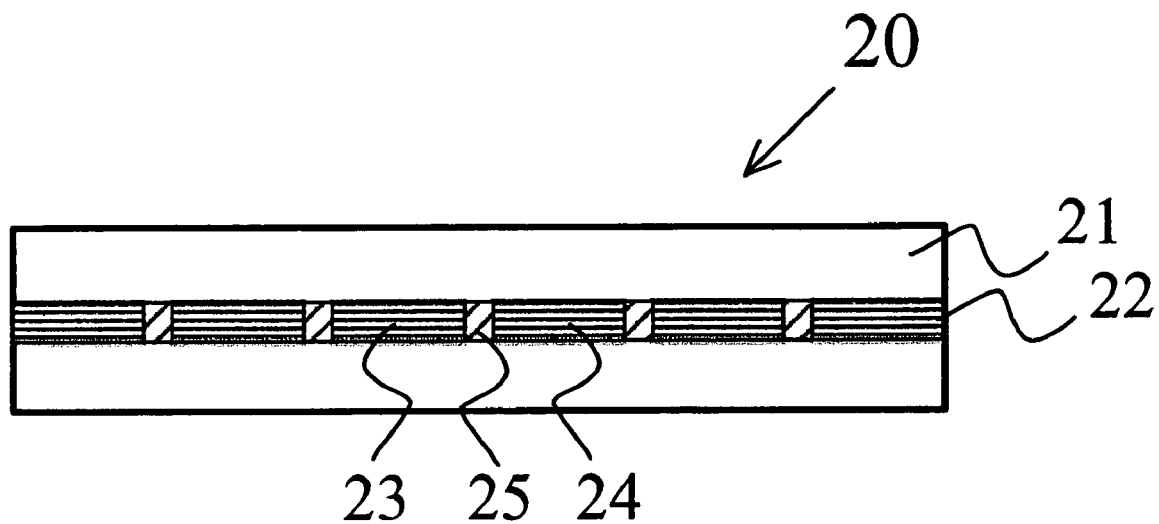
FIG. 2 is a schematic diagram of a segmented glass fiber mat incorporated at or near the mid-plane or the so-called neutral axis of a vinyl sheet floor covering.

Optionally, the segmented glass fiber mat can be incorporated at or near the neutral axis of the vinyl sheet floor covering, as is depicted by FIG. 2. Referring to FIG. 2, there is shown at 20 a vinyl sheet floor covering 21 with a segmented glass fiber mat at 22. This segmented glass fiber mat 22 is located at or near the mid-plane or the so-called neutral axis of the vinyl sheet floor covering 21. The bending of the vinyl sheet floor covering 21 creates minimal tensile loading on the segmented glass fiber mat 22. However, overall stretch or compression of the vinyl sheet floor covering 21 is supported by the segmented glass fiber mat 22. The segmented glass fiber mat 22 may be a woven or non-woven glass fiber mat that has been passed through a pair of patterned embossing rollers creating fiber fracture and segmentation. The segment pair 23 and 24 is held together by a polymeric coating 25. Polymeric coating 25 has a location that provides accommodation for the tensile stretch or compression of the vinyl sheet floor covering. A non-woven glass fiber segment may have some curved fibers that may slightly accommodate stretch of a segment, but a woven glass fiber segment has no ability to stretch. The segmented glass fiber mat 22 does not accommodate the deformation induced by the sub floor, but it is the polymeric coating 25, located between the segments 23 and 24 of glass fiber mat 22, that deforms with ease to accommodate the sub floor's physical morphing.

Figure 3:
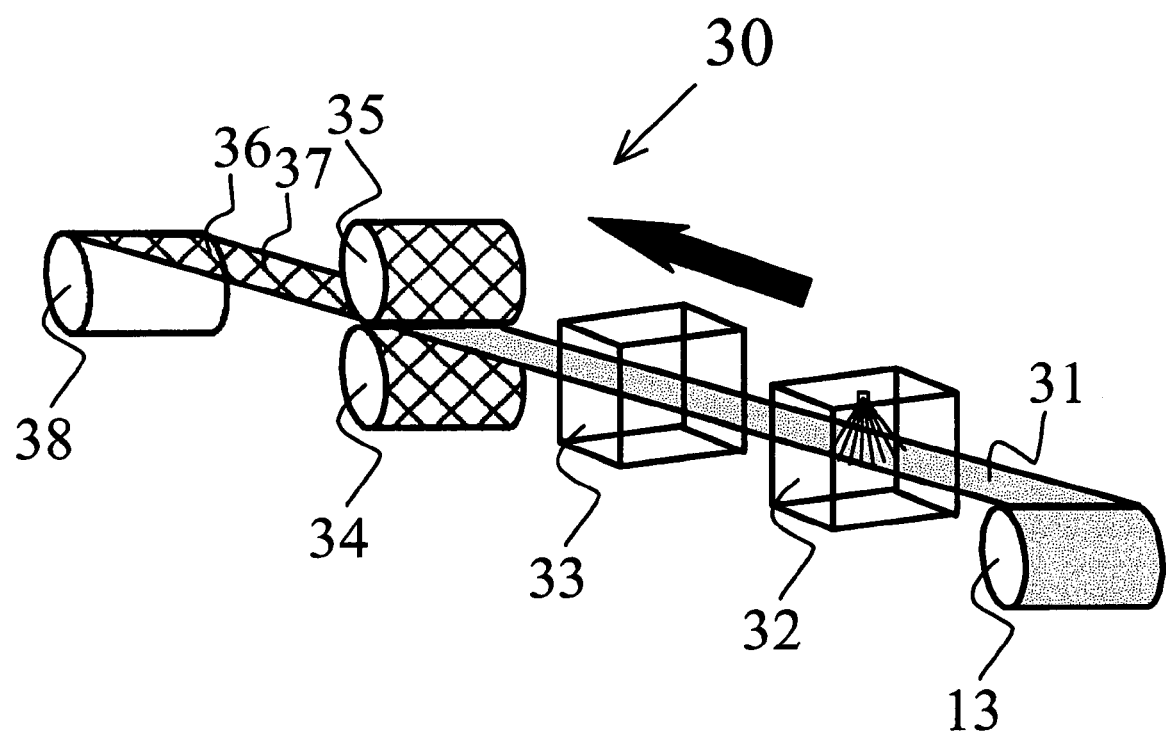
FIG. 3 is a schematic diagram of a manufacturing process for a segmented or scored glass fiber mat, wherein the glass fiber mat is bonded by a polymeric binder and the glass fibers are broken by a patterned roller that segments or perforates the woven or non-woven glass fiber mat.

The process for manufacturing the segmented glass fiber mat is shown in FIG. 3, at 30 and the process flow is shown by the arrow. Specifically, a glass fiber mat is shown at 31, it may be a woven glass fiber mat or a non-woven glass fiber mat. At station 32, the glass fiber mat 31 is coated with a polymeric coating that has a good bend resistance. Several polymeric compositions including polyethylene, polyvinyl chloride, and others meet this criterion. If polyvinyl chloride or other vinyl resins are used, they may blend in with the overall composition of the vinyl sheet floor covering. The polymer coating is cured at station 33 and the glass fiber mat 31 is passed through a set of patterned rollers 34 and 35. Patterned rollers 34 and 35 emboss and crush the glass fibers in the glass fiber mat along patterned lines 36 forming segments 37. The polymeric coating retains the segmented glass fiber mat and the segmented glass fiber mat is wound on roll 38.

In a separate processing step, from roll 38 the segmented glass fiber mat is fed to a vinyl coating station. There the vinyl composition is applied, encapsulating the segmented glass fiber mat. The show surface of the vinyl sheet floor covering is textured to cerate a decorative pattern.

The key components of the Vinyl Floor Covering System With Woven or Non-Woven Glass Fiber Mat Backing include, in combination, the features set forth below:

1. a woven or non-woven glass fiber mat reinforcement for a vinyl sheet floor covering is incorporated to provide strength and superior handling characteristics to the vinyl sheet floor covering;

2. the glass fiber mat is bonded to a vinyl sheet floor covering having patterned discontinuities, thereby creating small glass mat regions to accommodate sub floor movement in all directions in the plane of the sub floor;

3. the glass fiber mat with patterned discontinuities is bonded to the underside of the vinyl sheet floor covering;

4. the glass fiber mat with patterned discontinuities is bonded to the mid section of the vinyl sheet floor covering;

5. the glass fiber mat with patterned discontinuities is manufactured by passing the woven or non woven glass fiber mat through a set of patterned rollers that emboss or fragment the glass fiber mat along specific pattern defining lines that outline said small glass mat regions, and the patterned glass fiber mat is held together by a polymeric binder during vinyl sheet floor covering manufacture;

6. the patterned glass fiber mat with patterned discontinuities is intimately bonded with the vinyl sheet floor covering; and 7. the vinyl sheet floor covering has an optional decorative embossed show surface that is an opposed surface.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A vinyl floor covering, comprising:
   a. a vinyl sheet floor covering having an underside;
   b. a top show surface having colors, patterns, and textures printed or embossed thereon;
   c. said vinyl sheet floor covering having a thickness with a centerline;
   d. a neutral axis located at said centerline of said thickness of said vinyl sheet floor covering;
   e. a woven or non-woven glass fiber mat bonded by a polymeric binder and having segmented portions to form a segmented glass fiber mat, wherein the segments are in the form of discontinuities in the mat and are comprised of random or patterned disruptions of the glass fibers which separate from each other, the segments having polymeric binder therebetween;
   f. said segmented glass fiber mat being integrally bonded to said vinyl sheet floor covering to form said vinyl floor covering;
   g. said segmented glass fiber mat providing rigidity to said vinyl floor covering at said segmented portions of said segmented glass fiber mat, said vinyl floor covering operable to be placed on a subfloor having a surface, said subfloor being subject to floor dimensional changes;
   h. said segmented glass fiber mat providing accommodation to said floor dimensional changes by deformation of said polymeric binder located between said segmented portions of said segmented glass fiber mat;

said segmented glass fiber mat providing increased strength, flexure resistance, and creasing resistance to said vinyl floor covering.

2. A vinyl floor covering as recited by claim 1, wherein said segmented glass fiber mat is bonded to said underside of said vinyl sheet floor covering.

3. A vinyl floor covering as recited by claim 1, wherein said segmented glass fiber mat is bonded within said vinyl sheet floor covering at or near said neutral axis of said vinyl sheet floor covering.

4. A vinyl floor covering as recited by claim 1, wherein said segmented glass fiber mat has segments that are regularly patterned.

5. A vinyl floor covering as recited by claim 1, wherein said segmented glass fiber mat has segments that are randomly patterned.

6. A vinyl floor covering as recited by claim 1, wherein said segmented glass fiber mat has segments that are in alignment with said top show surface patterns thereby preserving pattern geometry.

7. A vinyl floor covering as recited by claim 1, wherein said segmented glass fiber mat has segment that are sized with a linear dimension in the range of 2 mm to 50 mm.

8. A vinyl floor covering as recited by claim 1, wherein said segmented glass fiber mat has segments that are sized with a linear dimension in the range of 5 mm to 40 mm.

9. A vinyl floor covering as recited by claim 1, wherein said segmented glass fiber mat has segments that are sized with a linear dimension in the range of 10 mm to 30 mm.

10. A vinyl floor covering as recited by claim 1, wherein said polymeric binder is selected from a group comprising polyethylene, polyvinyl chloride, and other vinyl polymers.

* * * * *